United States Patent
Jahr

(10) Patent No.: US 6,318,318 B1
(45) Date of Patent: Nov. 20, 2001

(54) ROCKER ARM ASSEMBLY

(75) Inventor: Ken O. Jahr, West Bloomfield, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/681,642

(22) Filed: May 15, 2001

(51) Int. Cl.[7] .............................. F01L 1/18; F01L 13/00; F02D 13/06
(52) U.S. Cl. ................................ 123/90.16; 123/90.11; 123/90.41; 123/198 F
(58) Field of Search ........................... 123/90.11, 90.15, 123/90.16, 90.27, 90.39, 90.41, 90.42, 90.43, 90.44, 198 F; 74/519, 559

(56) References Cited

U.S. PATENT DOCUMENTS

| | | | |
|---|---|---|---|
| 4,203,397 | * 5/1980 | Soeters, Jr. ........................ | 123/90.16 |
| 5,524,580 | * 6/1996 | Muir .................................. | 123/90.16 |
| 5,529,033 | * 6/1996 | Hampton ........................... | 123/90.16 |
| 5,544,626 | * 8/1996 | Diggs et al. ...................... | 123/90.16 |
| 5,619,958 | * 4/1997 | Hampton et al. ................. | 123/90.16 |
| 5,623,897 | * 4/1997 | Hampton et al. ................. | 123/90.16 |
| 5,653,198 | 8/1997 | Diggs ................................ | 123/90.16 |
| 5,660,153 | * 8/1997 | Hampton et al. ................. | 123/90.16 |
| 5,682,848 | * 11/1997 | Hampton et al. ................. | 123/90.16 |
| 5,690,066 | * 11/1997 | Hampton et al. ................. | 123/90.16 |
| 5,960,755 | 10/1999 | Diggs et al. ...................... | 123/90.15 |

* cited by examiner

Primary Examiner—Weilun Lo
(74) Attorney, Agent, or Firm—Carlos Hanze

(57) ABSTRACT

A rocker arm assembly 207 is provided which has an extendable plunger 212. The plunger 212 has a spring 136 biased first position contacting with a lost motion arm 44. In the first position, the plunger 212 prevents angular movement of the lost motion arm 44 with respect to a rocker arm body 208. In the first position, the rocker arm assembly 207 imparts full motion to a valve 19. A coil 224 is provided to bias the plunger 212 to a second position. In the second position, the plunger 212 does not contact the lost motion arm 44 and accordingly the lost motion arm 44 can have relative movement. When the lost motion arm 44 can have relative angular movement, the valve 19 is partially or totally deactivated.

15 Claims, 2 Drawing Sheets

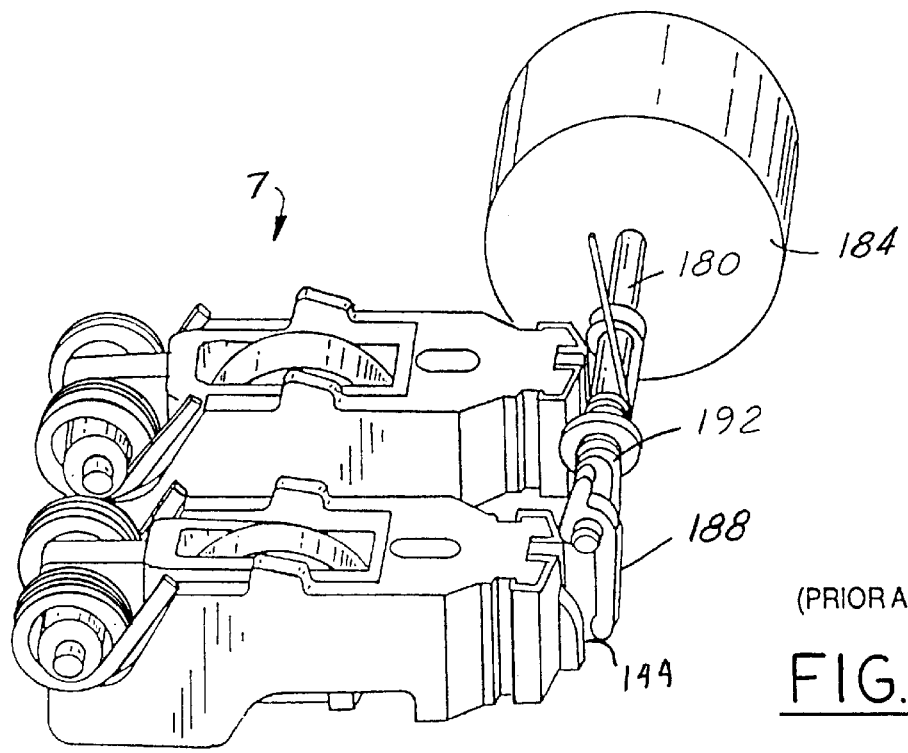
(PRIOR ART)
FIG. 3
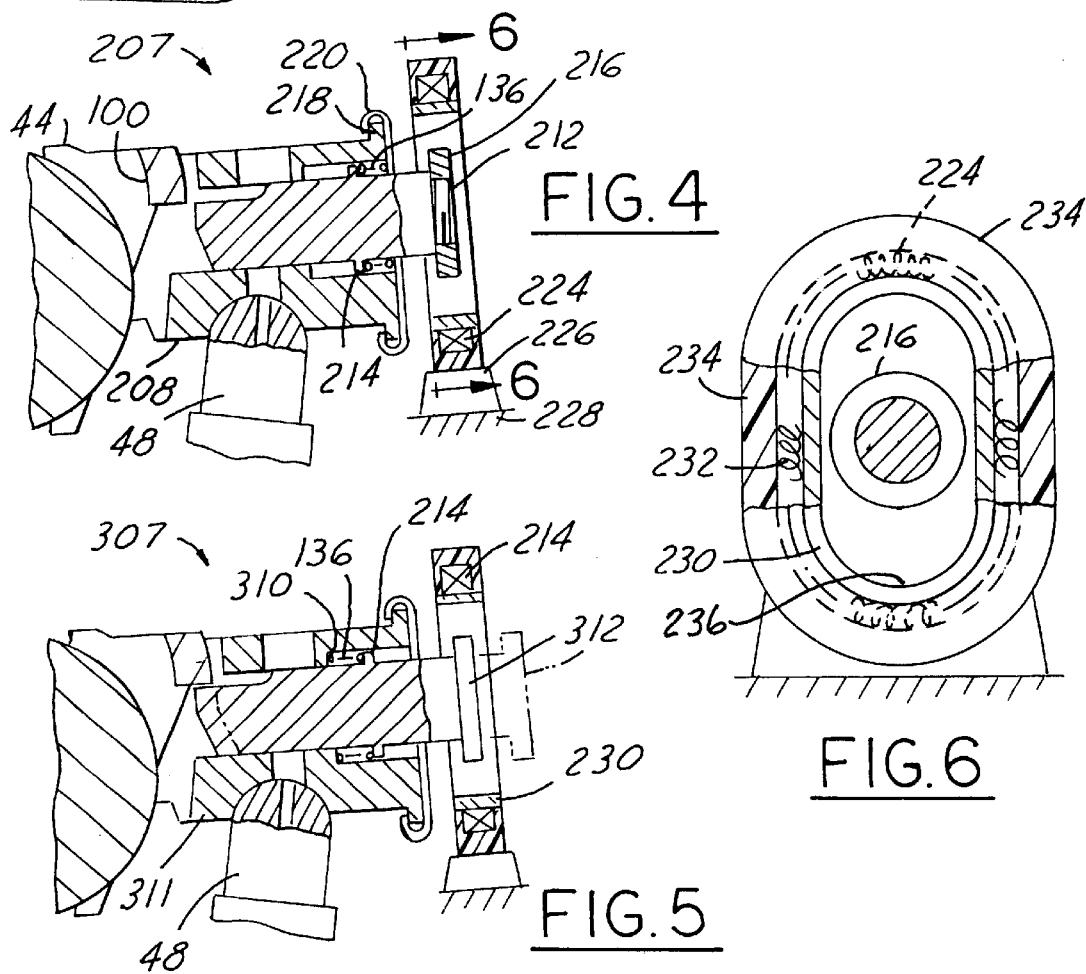
FIG. 4
FIG. 5
FIG. 6

ROCKER ARM ASSEMBLY

BACKGROUND OF INVENTION

The field of the present invention is that of rocker arm assemblies for internal combustion engines. More particularly, the field of the present invention is that of rocker arm assemblies for internal combustion engines which can be selectively switched between different states of activation of valve operation.

Rocker arms transmit motion from a rotating cam shaft to a stem of a poppet valve to open and close the valve. Almost universally, the valve is spring-biased shut and the cam via the rocker arm controls the opening and closing of the valve. One type of rocker arm is the finger-follower rocker arm.

In recent times, finger-follower and other types of rocker arms have been made to selectively totally or partially deactivate to allow enhanced control of vehicle engines in regard to emissions and fuel economy. In one such rocker arm assembly, the rocker arm has an outer body that engages the valve stem and an inner lost motion arm pivotally mounted on and within the outer body for movement relative to the outer body. The lost motion arm is spring biased upward against an overhead engine cam center lobe to be pivoted by the same. A latch mechanism with an extendable plunger is positioned within the outer body. The plunger is normally in a first position to limit movement of the lost motion arm relative to the outer body so that the cam lobe can pivot the outer body and lost motion arm together as an integral unit to activate the valve stem. Withdrawal of the latch mechanism plunger to a second position allows the lost motion arm to freewheel in a lost motion manner. When the latch mechanism plunger is in the second position the cam may cause the valve to be totally deactivated as described in U.S. Pat. No. 5,653,198 Diggs, issued Aug. 5, 1997. The placement of the latch mechanism plunger in the second position can also cause a low lift or partial deactivation of the valve as provided in U.S. Pat. No. 5,960,755 Diggs, et al. issued Oct. 5, 1999.

A spring biases the plunger in its aforementioned second position. To hold the latch mechanism plunger in the first position for normal operation of the engine there is provided an activating system. The activating system includes an axle or shaft rotatable by a solenoid. An activating arm is disposed about and extends radially from the shaft to engage or disengage the latch mechanism plunger in the first or second position. The activating arm has a contact surface which mates and contacts with the cylindrical surface of a latch pin which is physically connected to the latch mechanism plunger. The activating arm is urged into engagement with the latch pin by a helical coil spring disposed about the activator shaft. Typically in normal conditions the activating arm pushes against the spring which biases the latch mechanism plunger to the second position and thereby maintains the latch mechanism plunger in the aforementioned normal first position. When it is desirable for the latch mechanism plunger to move to its second (disabled or partially disabled position) an engine control unit will supply power to the activator solenoid to cause the activating arm to rotate away from the latch pin to allow the spring to move the latch mechanism plunger to its second position. The aforementioned activating system explained in further detail in Diggs, et al. U.S. patent application Ser. No. 09/731,371 is advantageous over a hydraulically activated system in its speed of response. However the Diggs, et al. rocker arm assembly having the aforementioned activating system is most conducive to a line of rocker arms on a common engine block bank. The activating system also requires a solenoid which is rotatable. If three or more rocker arms are desired to be disabled the rocker arms from a practical standpoint will have to be along a straight line so that a common shaft can be extended therebetween.

U.S. patent application Ser. No. 09/537,648 Russ, et al., now U.S. Pat. No. 6,237,559, (commonly assigned) provides a four-cycle internal combustion engine with cylinder combustion chamber deactivation. The deactivated cylinder has an exhaust poppet valve which can be selectively disabled. In providing such an engine, it may be desirable over the course of engine life to alternate which cylinders are selectively disabled. Accordingly it is desirable to provide a partial or totally disabled rocker arm assembly which has a high speed response and which can easily be individualized for each rocker arm assembly. In the past it was thought that individual latch mechanism plungers could be readily disabled by a hydraulic system. Although the hydraulic system worked it has been found that the speed of hydraulic movement of the pin is not fast enough for the rocker arm assembly to have a response which allows for the optimum emission reduction characteristics for the engine.

SUMMARY OF INVENTION

To overcome the limitation of the prior art, a revelation of the present invention is brought forth. In a preferred embodiment, the rocker arm assembly of the present invention provides a longitudinal extending body. The body is engagable adjacent a first end with an engine valve stem to activate the same. Opposite the first end, the body is engagable with a pivot fulcrum. A lost motion arm is provided. The lost motion arm is pivotally connected to the first end of the body. The lost motion arm is spring biased by torsion springs into engagement with a rotatable cam lobe of the engine.

A latch is provided which is connected on an end of the body generally opposite the pivotal connection of the lost motion arm with the body. The latch includes an extendable plunger having a first position with engagement with the lost motion arm to prevent angular movement of the lost motion arm with respect to the body in a first given angular direction. When the lost motion arm cannot angularly move with respect to the body in the first given angular direction, the movement of the lost motion arm by the cam is imparted to the body to provide a first state of activation of the valve stem.

The plunger has a second position that allows the lost motion arm to pivot relative to the body for a second state of deactivation of the valve stem. In the second state of deactivation, the valve is either partially or totally deactivated. A selectively activatable coil is provided which has a fixed position with respect to a body of the engine. The coil creates a magnetic field to bias the plunger to one of the first or second aforementioned positions.

It is an advantage of the present invention to provide a rocker arm assembly wherein the latch mechanism plunger can be biased by a magnetic coil. It is another advantage of the present invention to provide a rocker arm assembly wherein an individual rocker arm assembly can be disabled with a high response rate.

Other features and advantages of various embodiments of the present invention will become more apparent to those skilled in the art from the reading of the following detailed description and upon reference to the drawings.

BRIEF DESCRIPTION OF DRAWINGS

FIG. 3 is a perspective view of two rocker arm assemblies in an activating system prior to the present invention.

FIG. 4 is a partial sectional view of a preferred embodiment rocker arm assembly according to the present invention.

FIG. 5 is a partial sectional view similar to that of FIG. 4 of an alternate preferred embodiment rocker arm assembly according to the present invention.

FIG. 6 is a view taken along line 6—6 of FIG. 4.

DETAILED DESCRIPTION

Figure 1:
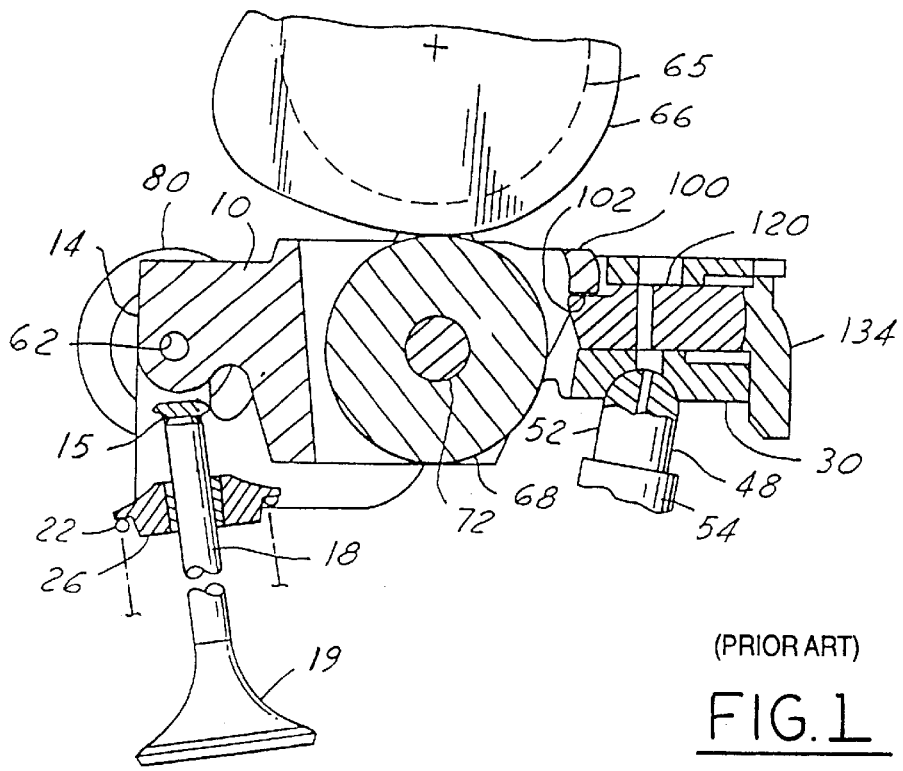
FIG. 1 is a sectional view of a prior art finger follower rocker arm assembly.
Figure 2:
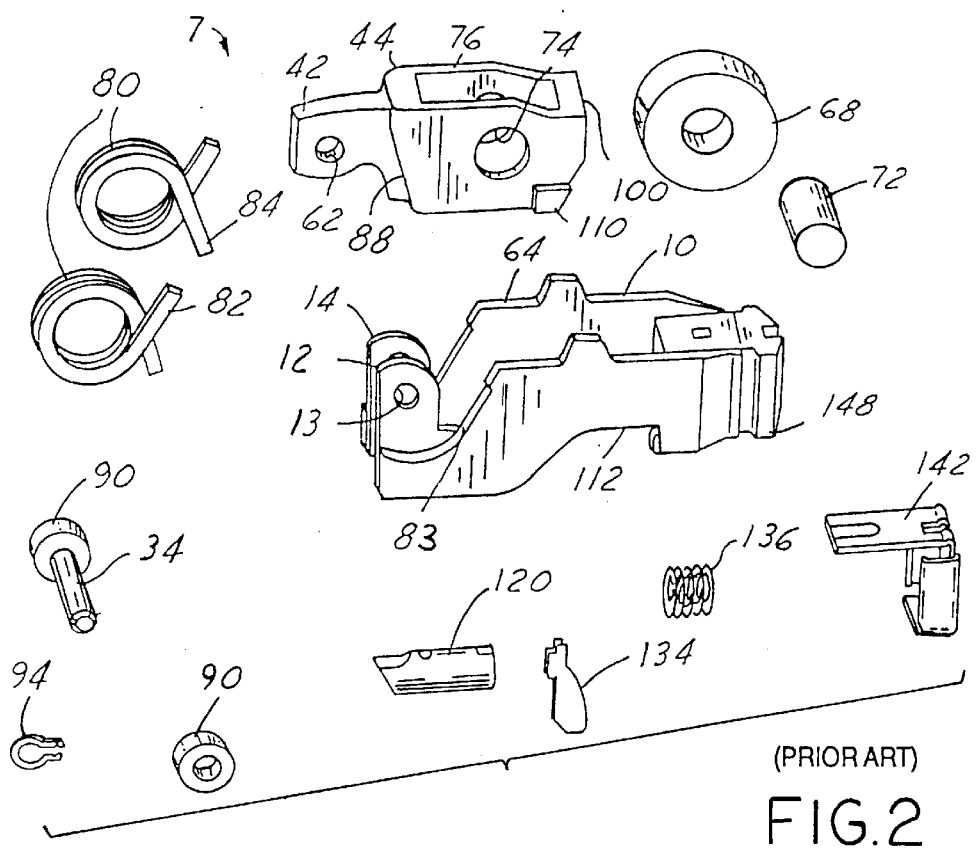
FIG. 2 is an exploded view of the rocker arm assembly illustrated in FIG. 1.

FIGS. 1 through 3 illustrate an internal combustion engine rocker arm assembly 7 prior to the present invention. The rocker arm assembly 7 has a forked shaped body 10 which is often referred to as a cradle or outer arm. The body has twin ears 12 (FIG. 2), the ears 12 have a transverse bore 13. The body 10 has a first end 14. The body first end 14 is engagable with a valve stem 18 via a convex contact surface 15 (only partially shown) of the body 10 for activation of a poppet valve 19. The valve stem 18 is biased generally upward by a spring 22 which is captured by a valve stem collar 26. The upward biasing of the valve stem 18 places the valve 19 in a closed position to prevent fluid communication through a port to a combustion chamber (not shown) of the engine. To open the poppet valve 19, the body first end 14 will pivot in a generally counter-clockwise direction.

The body 10 has an opposite second end 30. The second end 30 is engagable with a pivot fulcrum 48. The pivot fulcrum 48 is provided by a plunger portion 52 of a hydraulic lash adjuster 54. The body second end 30 has a spherical socket receiving the plunger 52. The lash adjuster 54 constitutes a stationary fulcrum for pivotal movement of the body 10 of the rocker arm assembly 7 in a manner to be described.

An inner arm or lost motion arm 44 is pivotally connected to the first end 14 of the body 10. A pin 34 passes through bores 13 and 62. A lever end 42 of the lost motion arm is pivotally connected by the pin 34. The lost motion arm 44 fits in between the yokes 64 of the body. The lost motion arm 44 is spring biased arcuately in a counter-clockwise direction as shown in FIG. 1 to have contact with a rotatable cam lobe 66. The cam lobe 66 is rotated by a cam shaft (not shown) which is powered by the engine. To make contact with the cam lobe 66, the lost motion arm 44 has a roller 68. The roller 68 is rotatably connected to the lost motion arm 44 via a pin 72 which is mounted within a bore 74 of parallel front extending fingers 76 of the lost motion arm 44. The lost motion arm 44 is spring biased into the cam lobe 66 by coil torsion springs 80. The coil torsion springs 80 have a first leg 82 which pushes against ramps 83 of the body 10. The springs 80 also have a second leg 84 which interacts with incline surface 88 of the lost motion arm 44 to urge it in a previously mentioned counter-clockwise direction. The springs 80 encircle the pin 34 and are mounted on the dual heads 90 of the pin. The heads 90 are held in position on the pin 34 by a retention washer 94.

The fingers 76 of the lost motion arm have extending between them a bridge 100. The bridge 100 along its bottom end has a first contact surface 102. The lost motion arm 44 also has a lateral stud projection 110 which limits its extreme counter-clockwise angular movement with respect to the body 10 by contact with a lower surface 112 of the body.

The second end 30 of the body also has a latch mechanism. The latch mechanism includes an extendable plunger 120. The plunger 120, as shown in FIG. 1, has a first position wherein it is contacting with the first contact surface 102 of the lost motion arm bridge 100. In the first position (FIG. 1), the plunger 120 prevents relative angular motion of the lost motion arm 44 with respect to the body 10 in a clockwise direction. The plunger 120, has a second position which is non-contacting with the lost motion arm bridge 100 to allow the lost motion arm 44 to pivot clockwise relative to the body 10.

The plunger 120 has fixably connected thereto a latch pin 134 shown separated from the plunger 120 in FIG. 1. A spring 136 encircles the plunger 120 in its position within a bore of the body 10. The spring 136 urges the latch pin 134 to the right, to position the plunger 120 in its aforementioned second position. The plunger 120 is held to the body 10 by a latch pin retainer 142. The latch pin retainer 142 clips onto a transverse ledge 148 of the body 10.

An activating system (FIG. 3) includes an axle or shaft 180 rotatable by a solenoid 184. The activating system further includes at least one activating arm 188 disposed about and extending radially from the shaft 180 to engage or disengage the latch pin 134. The activating arm 188 has a contact surface which mates and contacts with a cylindrical surface 144 of the latch pin. The activating arm 188 is urged into engagement with the latch pin 134 by a helical coil spring 192 disposed about the activator shaft 180. When it is desirable for the plunger 120 to assume its second position, the engine control unit will supply power to the activator solenoid 184 to cause the activating arm 188 to rotate away from the latch pin 134 to allow the spring 136 to move the plunger 120 to its second position.

Typically the plunger 120 will be in the position shown in FIG. 1. In its first position, the plunger makes contact with the lost motion arm bridge first contact surface 102. Accordingly, the lost motion arm 44 is now limited in its movement clockwise with respect to the body 10. In a first state of activation, rotation of the cam lobe 66 causes the lost motion arm 44 and the cam body to pivot about the fulcrum provided by the lash adjustor 54 and accordingly rotate as a unit in a counter-clockwise direction about the lash adjustor fulcrum to cause the contact surface 15 to push downward on the valve stem 18 to open the valve 19. Upon further rotation of the cam lobe 66, the unit of the lost motion arm 44 and the body 10 will rotate back in a clockwise position, therefore allowing the upward movement of the valve stem 18 to close the valve 19.

In the second state of deactivation of the rocker arm assembly 7, the cam shaft (not shown) may on either side or both sides of the rotating cam lobe 66 have another lobe 65 (shown in phantom in FIG. 1). The lobe 65 can engage with high points on the yoke 64 of the body to give a short duration operation as best explained in commonly assigned U.S. Pat. No. 5,960,755, Diggs, et al., issued Oct. 5, 1999. If the lobe 65 and the high points on the yoke 64 are eliminated, the second state of deactivation will be similar to that described in U.S. Pat. No. 5,653,198, Diggs, issued Aug. 5, 1997, wherein the valve is completely deactivated. The disclosures of both the aforementioned patents are incorporated by reference herein.

Turning additionally to FIGS. 4–6, a rocker arm assembly 207 is provided according to the present invention. Those items identical or substantially similar to prior rocker arm assembly 7 (FIGS. 1–3) are given identical reference numerals. A rocker arm body 208 is pivotally supported on the pivot fulcrum 48 as previously described and additionally has a substantially similar, if not identical, lost motion arm 44.

Rocker arm assembly 207 has a plunger 212. The plunger 212 has a flange 214. At an extreme end, the plunger 212 has a stator or enlarged head 216. The enlarged head 216 is threadably connected on the remainder of the plunger 212.

The body 208 has vertical ledges 218. The ledges 218 have clipped onto them a retainer member 220. A spring 136 engages the flange 214 and the retainer 220 to spring bias the plunger 212 to the first position. In the first position the plunger 212 makes contact with the bridge 100 of the lost motion arm 44 to place the rocker arm assembly 207 in its first mode or state of operation wherein the valve 19 will be fully activated. As shown in FIG. 4, the plunger is pulled back from the first position to a second position by a coil 224. The coil 224 has a base 226. The base 226 is fixably connected with the body of the engine block 228. The coil 224 has a core 230 made of a ferrite material. The core 230 can be iron or another ferrite alloy or can be a permanent magnet.

The core 230 is encircled by wire winding 232 (FIG. 6). The wire winding 232 and the core are protected by a polymeric plastic encapsulation 234. The coil 224 has a generally oblong shape and inner opening 236. The oblong opening 236 allows the enlarged head 216 to have clearance with the coil 224.

During the pre-assembly of the rocker arm assembly 207, the enlarged head 216 can be removed to allow for the penetration of the plunger 212 main body through the retainer 220. The spring 136 will then be placed about the plunger between the flange 214 and the retainer 220. The plunger will then be placed within the body 208 and the retainer 220 will be snapped over the ledges 218. The enlarged head 216 will then be connected with the remainder of the plunger 212.

In normal conditions as previously mentioned, the spring 136 biases the plunger 212 to the first position causing the plunger 212 to contact with the bridge 100 of the lost motion arm 44 and thereby limit its relative rotation with respect to the body 208. When it is desirable to bring the rocker arm assembly 207 to its second state of activation, the coil 224 will be activated and create a magnetic field to bias the plunger 212 to the second position. If the core is a permanent magnet, the windings 232 can be assembled about the core to either add to the magnetic field of the core 230 thereby allowing activation of the plunger 212 under lower currents. However, in many instances, it is preferable that the core 230 be non-magnetic so as not to attract metallic particles out of the lubricating oil.

Referring to FIG. 5, with like items being given similar reference numerals to those in FIG. 4, a rocker arm assembly 307 is provided. The rocker arm assembly 307 has a spring 136 which is captured between the flange 214 and a counter-bore 310 provided in the body 311. The spring biases the plunger 312 in to the second position. The plunger 312 is somewhat longer than the plunger 212. In the first position, wherein the plunger 312 prevents the lost motion arm from rotating, the strength of the permanent magnet core 230 retains the pin in the first position. Selective activation of the coil 224 induces a magnetic field which cancels the magnetic field of the core 230 and thereby allows the spring 136 to move the plunger 312 to its second position.

While preferred embodiments of the present invention have been disclosed, it is to be understood that they have been disclosed by way of example only and that various modifications can be made without departing from the spirit and scope of the invention as it is encompassed by the following claims.

What is claimed is:

1. An engine rocker arm assembly comprising:

a body engagable adjacent a first end with a valve stem, said body being engagable with a fulcrum adjacent an end opposite said first end;

an arm pivotally connected to one of said ends of said body, said arm being biased into engagement with a cam lobe;

a latch connected on an end of said body generally opposite said pivotal connection of said arm with said body, said latch including an extendable plunger having a first position for engagement with said arm to prevent angular movement of said arm with respect to said body in a first given angular direction to thereby transmit movement of said arm by said cam to said body for a first state of activation of said valve stem, and said plunger having a second position to allow said arm to pivot relative to said body for a second state of deactivation of said valve stem; and a selectively activatable coil having a fixed position with respect to a block of said engine for creating a magnetic field to bias said plunger to at least one of said first and second positions, wherein said coil substantially encircles an enlarged head of said plunger.

2. An engine rocker arm assembly as described in claim 1, wherein said coil biases said plunger to said first position.

3. An engine rocker arm assembly as described in claim 1, wherein said coil biases said plunger to said second position.

4. An engine rocker arm assembly as described in claim 1, wherein said coil has windings encapsulated in a polymeric material.

5. An engine rocker arm assembly as described in claim 1, wherein said coil is shaped in a generally oblong manner.

6. An engine rocker arm assembly as described in claim 1, wherein said head is removable from a remainder of said plunger.

7. An engine rocker arm assembly as described in claim 1, wherein said coil has windings wound about a permanent magnet core.

8. An engine rocker arm assembly as described in claim 7, wherein activation of said coil adds to a magnetic field of said permanent magnet core.

9. An engine rocker arm assembly as described in claim 7, wherein said activation of said coil cancels a magnetic field of said permanent magnet core.

10. An engine rocker arm assembly as described in claim 1, wherein said plunger has a flange for engagement with a biasing spring.

11. An engine rocker arm assembly as described in claim 10, wherein said biasing spring biases said plunger to said first position.

12. An engine rocker arm assembly as described in claim 11, wherein a retainer is connected on said body and said spring is captured between said retainer and said plunger flange member.

13. An engine rocker arm assembly as described in claim 10, wherein said biasing spring biases said plunger to said second position and said spring is captured between said flange of said plunger and an end of a counter bore within said body.

14. An engine rocker arm assembly comprising:

a body engagable adjacent a first end with a valve stem, said body being engagable with a fulcrum adjacent an end opposite said first end;

an arm pivotally connected to one of said ends of said body, said arm being biased into engagement with a cam lobe;

a latch connected on an end of said body generally opposite said pivotal connection of said arm with said body, said latch including an extendable plunger having a first spring biased position for engagement with said arm to prevent angular movement of said arm with respect to said body in a first given angular direction to thereby transmit movement of said arm by said cam to said body for a first state of activation of said valve stem, and said plunger having a second position to allow said arm to pivot relative to said body for a second state of deactivation of said valve stem; and a selectively activatable oblong coil which substantially encircles said plunger said plunger with a clearance therebetween and has a fixed position with respect to a block said engine for creating a magnetic field to bias said plunger to said second position.

15. A method of multiple states of activation of an internal combustion engine poppet valve comprising:

engaging a body of a rocker arm assembly adjacent a first end with a stem of said poppet valve;

engaging said body with a fulcrum adjacent an end opposite said first end; pivotally connecting an arm to one of said ends of said body;

biasing said arm into engagement with a cam lobe;

connecting a latch on an end of said body generally opposite said pivotal connection of said arm with said body, said latch including an extendable plunger having a first position for engagement with said arm to prevent angular movement of said arm with respect to said body in a first given angular direction to thereby transmit movement of said arm by said cam to said body for a first state of activation of said valve stem, and said plunger having a second position to allow said arm to pivot relative to said body for a second state of deactivation of said valve stem; and selectively activating an oblong coil which substantially encircles said plunger with a clearance therebetween and has a fixed position with respect to a block of said engine to create a magnetic field to bias said plunger to at least one of said first and second positions.

* * * * *